United States Patent
Jensen

(10) Patent No.: US 12,279,668 B2
(45) Date of Patent: Apr. 22, 2025

(54) SOLE PART, A MOULDING ASSEMBLY AND A MANUFACTURING METHOD FOR AN ARTICLE OF FOOTWEAR

(71) Applicant: ECCO Sko A/S, Bredebro (DK)

(72) Inventor: Frank Jensen, Bredebro (DK)

(73) Assignee: ECCO Sko A/S, Bredebro (DK)

(*) Notice: Subject to any disclaimer, the term of this patent is extended or adjusted under 35 U.S.C. 154(b) by 172 days.

(21) Appl. No.: 17/357,247

(22) Filed: Jun. 24, 2021

(65) Prior Publication Data

US 2021/0401115 A1 Dec. 30, 2021

(30) Foreign Application Priority Data

Jun. 26, 2020 (EP) .................................. 20182453

(51) Int. Cl.
*A43B 13/14* (2006.01)
*B29D 35/14* (2010.01)

(52) U.S. Cl.
CPC ............ *A43B 13/14* (2013.01); *B29D 35/142* (2013.01); *B29D 35/148* (2013.01)

(58) Field of Classification Search
CPC ..... A43B 13/14; B29D 35/142; B29D 35/148
USPC ........................................................ 264/244
See application file for complete search history.

(56) References Cited

U.S. PATENT DOCUMENTS

| | | | | |
|---|---|---|---|---|
| 2,008,985 | A * | 7/1935 | Lattemann | A43B 7/1435 36/145 |
| 9,764,521 | B2 * | 9/2017 | Hansen | B29C 45/2675 |
| 2001/0032397 | A1 * | 10/2001 | Ho | A43B 9/06 36/43 |
| 2015/0289586 | A1 | 10/2015 | Wan et al. | |
| 2018/0153252 | A1 | 6/2018 | Archer et al. | |

FOREIGN PATENT DOCUMENTS

| | | |
|---|---|---|
| CN | 102573543 | 7/2012 |
| CN | 110139576 | 8/2019 |
| CN | 110167749 | 8/2019 |
| CN | 110662451 | 1/2020 |
| CN | 111741692 | 10/2020 |
| FR | 1253975 | 2/1961 |
| WO | WO2005096859 | 10/2005 |
| WO | WO2016144410 | 9/2016 |

OTHER PUBLICATIONS

Extended EP Search Report for corresponding EP Patente Application No. 20182453.9 dated Oct. 22, 2020, 7 pages.
Chinese Office Action for corresponding China Patent Application No. 2023121401769170 dated Dec. 14, 2023, 11 pages.

* cited by examiner

*Primary Examiner* — Alison L Hindenlang
*Assistant Examiner* — Erica Hartsell Funk
(74) *Attorney, Agent, or Firm* — Lee & Hayes, P.C.

(57) ABSTRACT

Embodiments herein disclose a primary sole part (10) having a foot facing surface (11) and a ground facing surface (12). The primary sole part (10) comprises a plurality of through-going holes (14), wherein the plurality of through-going holes extends in a vertical direction from the foot facing surface (11) to the ground facing surface (12). The foot facing surface (11) is configured to receive an injected sole material for attaching the primary sole part to a ground facing surface (12) of an upper (1).

11 Claims, 6 Drawing Sheets

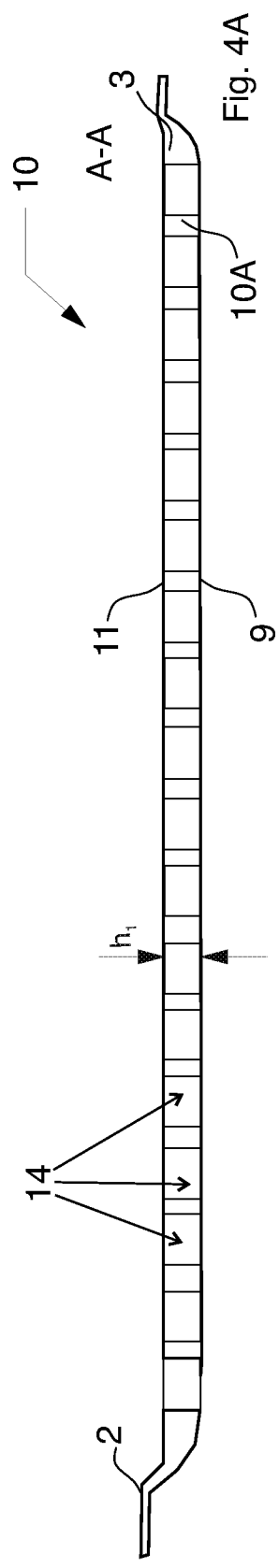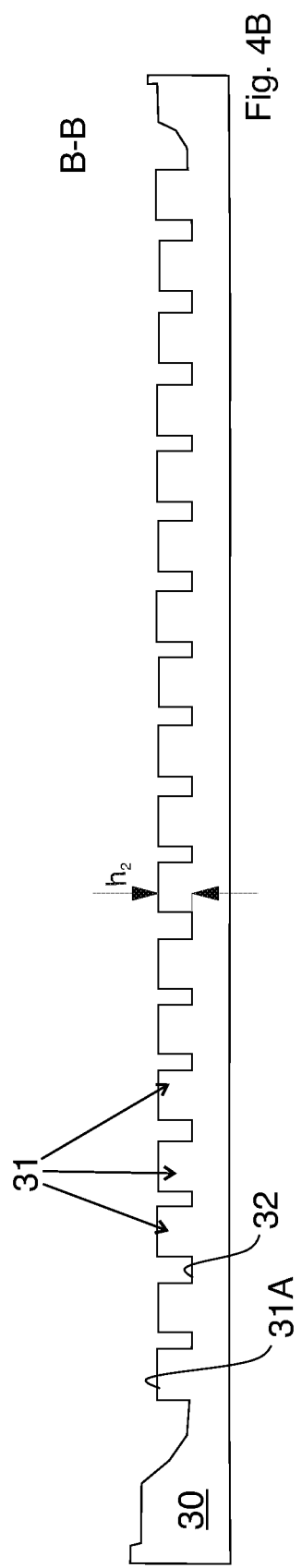

SOLE PART, A MOULDING ASSEMBLY AND A MANUFACTURING METHOD FOR AN ARTICLE OF FOOTWEAR

This Application claims priority to EP 20182453.9, filed Jun. 26, 2020, an entirety of which is incorporated herein by reference.

TECHNICAL FIELD

The present disclosure pertains to the field of footwear. The present disclosure relates to primary sole part for an article of footwear, the primary sole part comprising a plurality of through-going holes. The present disclosure further relates to an article of footwear comprising the primary sole part. The present disclosure further relates to a footwear sole moulding assembly comprising primary mould part, the primary mould part comprising at least one protrusion configured to mate with the plurality of through-going holes of the primary sole part. The present disclosure further relates to a method for moulding a footwear, wherein the method comprises mounting the primary sole part to the primary mould part, such that the plurality of protrusions of the primary mould part mate to the plurality of through-going holes of the primary sole part, and injecting a material into the footwear moulding assembly such that the injected material adheres to the primary sole part.

BACKGROUND

In shoe production, there are a number of ways to manufacture a pair of shoes, where the manufacturing method, the choice of material, the form of the upper, the form and material of the midsole, and the form and shape of the outsole have a huge impact in how the shoe performs. There are a number of different types of shoes, such as hiking boots, sport shoes, golf shoes, running shoes, where the shoes have different qualities such as the stiffness of the upper, the stiffness of the outsole or midsole, where the qualities of the shoe are controlled by different factors.

One of the important factors for producing a specific type of shoe, that acts in a certain way is the design, shape and hardness of the sole of the shoe. This has traditionally been done by introducing items such as shanks or embedded reinforcement elements to improve the stiffness of the material in a certain area, while maintaining a certain flexibility in other areas or to apply reinforcements to the outer surfaces of the sole in order to change the characteristics of the sole.

In direct injection moulding techniques for shoes, the sole, such as a midsole, and/or the outsole of the shoe is/are injected directly onto the upper of the shoe, where a last holds the upper, and a mould having the shape of the sole is introduced onto the upper and a thermoplastic material is injected directly onto the upper, fixing the midsole and/or the outsole to the upper. This means that the outsole is injected directly onto the upper, and there is no need for adhering or otherwise fixing the midsole/outsole to the upper.

In direct injection moulding techniques, changing the characteristics of the sole and/or the outsole, or providing a more complex sole and/or outsole, where certain areas may be rigid, while other areas are flexible, may require a number of different steps of injection moulding, using a number of different moulds to obtain the required properties. This is both costly and time consuming for manufacturing purposes.

US 2018/0153252 discloses a method of injection moulding a sole assembly, where the sole assembly may be moulded in different steps to an upper. In a first step, a midsole core may be direct injection moulded to a bottom of an upper, and in a second step, an outsole may be direct injection moulded to the bottom of the midsole and surrounding at least part of the midsole core. Such an operation requires at least two rounds of injection moulding in a ring moulding machine and requires a trimming of the injected material between each of the direct injection moulding operations. Thus, the machine and labour costs of such a production may be relatively high, thereby increasing the manufacturing costs of an article of footwear.

SUMMARY

Thus, there is a need for a structure and manufacturing techniques of a shoe, which mitigate, alleviate or address the existing shortcomings and allow certain properties of the shoe to be obtained through simpler means.

In accordance with the present description there is presented a footwear sole moulding assembly comprising: a primary sole part having a foot facing surface, and a ground facing surface, wherein the primary sole part comprises a plurality of through-going holes, wherein the plurality of through-going holes extends in a vertical direction from the foot facing surface to the ground facing surface; wherein the foot facing surface is configured to receive an injected sole material for attaching the primary sole part to a ground facing surface of an upper; and a primary mould part comprising a plurality of protrusions configured to mate with the plurality of through-going holes of the primary sole part.

Further, an article of footwear is disclosed. The article of footwear comprises the primary sole part disclosed herein.

Since the primary sole part has to be durable in order to withstand the friction between the ground facing surface of the primary sole part and the ground, the primary sole part is often made of a material having a higher density than e.g. a midsole of a shoe, where the increased density may contribute to an improved durability, as is an example where the primary sole part is made out of a natural rubber or TPU (Thermoplastic Polyurethane), while the midsole is made of a PU (Polyurethane). By providing through-going holes in the primary sole part, the weight of the assembled article of footwear may be reduced with improves user comfort. This has however been traditionally done with cemented shoes, i.e. where a primary part is adhered to a midsole, while this has not been viable with direct injection moulded articles of footwear, as the injected material will enter the openings, where there is no sole material to prevent this. This has however been solved by providing a mould part, having mating protrusion that prevent the sole material to enter the openings from a foot facing surface. Furthermore, the provision of through-going holes in the primary sole part increases flexibility of the primary sole part. Thereby the primary sole part may adapt to the shape of the foot of a user of the article of footwear during use, which further increases the comfort of the user of the article of footwear.

Traditionally, within the technical field of direct injection moulding, a shoe part that is to be moulded to a shoe assembly has been provided in such a way that the part is a continuous part, where the part provides a barrier between the inner surface of the mould and the injected material. The injected material is often of the kind where the material expands after it has been introduced into the mould, so that the material expands into any cavity it is in fluid communication with and may also force itself into areas between the part and the mould, creating material which has flowed out of the mould cavity and has to be cut or trimmed from the article of footwear after moulding has been completed. Thus, the trimming operation of the article of footwear increases the labour hours that need to be applied during production, which in turn increases the cost of production.

The provision of an injection moulding assembly in accordance with the current disclosure, means that it is possible to reduce the weight and/or amount of material that is used for a shoe part, such as the primary sole part, as the openings in the shoe part reduce the area and/or volume of material of the shoe part. The protrusions of the primary mould part may be configured to block the injected material from entering the openings, so that the protrusions stop the injected material from seeping or forcing itself out through the openings.

By providing an injection moulding assembly in accordance with the current disclosure, it is possible to provide a prefabricated part, such as a primary sole part, in a sole moulding assembly, where a midsole, or injected material, may be injected between the primary sole part and the upper, allowing the injected material to attach the primary sole part to the sole assembly. Thus, the injected material may be a soft material which provides comfort to the footwear assembly, while the primary part may be of a different material, having a higher wear resistance, thereby improving the wear resistance of the sole assembly. Furthermore, the primary sole part may have a plurality of through-going openings, while maintaining a ground contacting surface, thereby reducing the weight of the wear resistant material, compared to materials that are uninterrupted.

Further, a method for moulding a footwear is disclosed, wherein the method comprises mounting a primary sole part as disclosed herein to a footwear sole moulding assembly as disclosed herein, so that the plurality of protrusions of the primary mould part mate with the plurality of through-going holes of the primary sole part and protrude through the plurality of through-going holes. The method further comprises injecting a material into the footwear moulding assembly, such that the injected material adheres to the foot facing surface of the primary sole part and defines a secondary sole part of the footwear.

By providing the primary mould part with a plurality of protrusions being configured to mate with the through-going holes of the primary sole part, the primary sole part may be moulded to an article of footwear using an injection moulding process. During the injection moulding process injected material fills out all cavities inside a footwear moulding assembly and would also fill out the plurality of through-going holes of the primary sole part. By mating the plurality of protrusions with the plurality of through-holes, the through-holes may be closed which prevents the injected material to enter the through-going holes. Thereby, the characteristics of the primary sole part, such as being lightweight and flexible, may be maintained throughout the injection moulding process. Thereby, an article of footwear comprising the primary sole part can be manufactured in a single moulding step, which is cost and time efficient.

In accordance with the present description, there is provided an article of footwear comprising: an upper having a first ground facing surface; a primary sole part having a first foot facing surface, and a second ground facing surface, the first foot facing surface comprising a plurality of openings, each opening defining a volume extending in a vertical direction from the foot facing surface towards the ground facing surface and having a closed end; and a secondary sole part having a second foot facing surface and a third ground facing surface, wherein the secondary sole part is arranged between the upper and the primary sole part and extends into the plurality of volumes and/or openings in the first foot facing portion of the primary sole part.

Since the primary sole part has to be durable in order to withstand the friction between the ground facing surface of the primary sole part and the ground, the primary sole part is typically relatively heavy. By providing a plurality of through-going holes in the primary sole part the weight of the primary sole part and the assembled article of footwear comprising the primary sole part may be reduced which improves the comfort for a user of the article of footwear.

The present disclosure may also relate to a primary sole part having a foot facing surface, and a ground facing surface, wherein the primary sole part comprises a plurality of through-going holes, wherein the plurality of through-going holes extends in a vertical direction from the foot facing surface to the ground facing surface; wherein the foot facing surface is configured to receive an injected sole material for attaching the primary sole part to a ground facing surface of an upper.

In accordance with an exemplary embodiment of the invention, the primary sole part may be a prefabricated part. The primary sole part may have a foot facing surface, where the foot facing surface of the primary sole part may define a part of the mould cavity for an injected material and may optionally in combination with the primary mould part define a part of the mould cavity for an injected material. Thus, the primary mould part may define a first part of a mould cavity, and the primary sole part may define a second part of a mould cavity, and when the primary sole part is attached to the primary mould part, the primary sole part and the primary mould part may together define a part of the mould cavity that is larger than the primary sole part or the primary mould parts on their own.

The projections of the primary mould part may be adapted to close the openings of the primary sole part, so that the primary mould part closes off the openings and prevents injected material to enter the openings of the primary sole part.

The joining of the primary sole part and the primary mould part may thereby create an uninterrupted part of the mould cavity for the injected material, where the interrupted parts (openings) of the primary sole part are closed using the projections of the primary mould part. When the injected material is cured, the projections may be removed from the primary sole part, and thereby exposing the inner volume of the openings from the ground facing surface and inwards towards the cured injected material. Thus, after injection moulding, the openings may expose the injected material of the sole assembly via the opening, while the material between the openings functions as a wear resistance part and comes into contact with the ground.

BRIEF DESCRIPTION OF THE DRAWINGS

The following is an explanation of exemplary embodiments with reference to the drawings, in which FIG. 4A shows a longitudinal cross-sectional view of the primary sole part, FIG. 4B shows a longitudinal cross-sectional view of the primary mould part.

DETAILED DESCRIPTION

Figure 1:
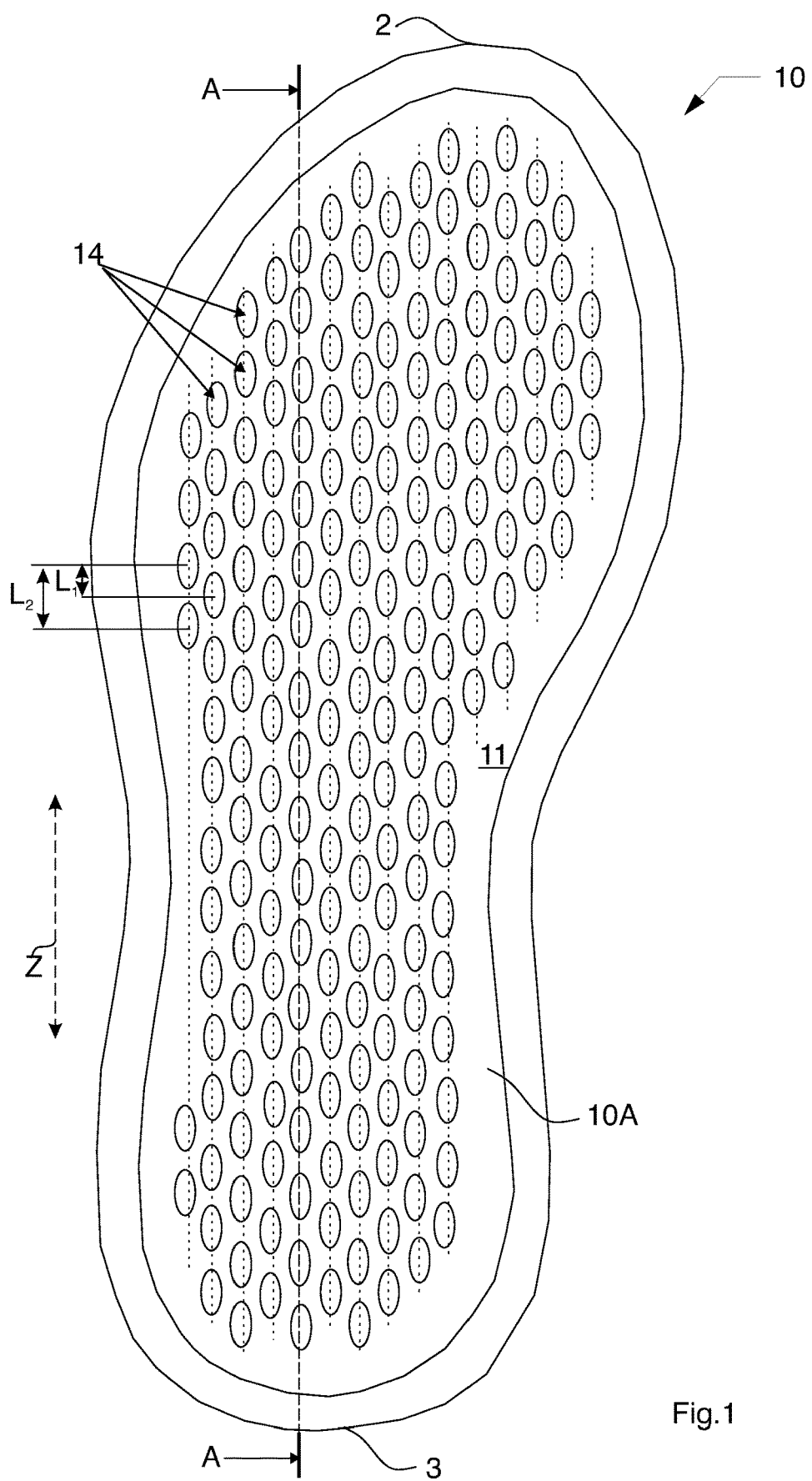
FIG. 1 shows a top down view of a foot facing surface of a primary sole part.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

A primary sole part is disclosed. The primary sole part has a foot facing surface and ground facing surface. The primary sole part comprises a plurality of through-going holes. The plurality of through-going holes extend in a vertical direction from the foot facing surface to the ground facing surface. The foot facing surface of the primary sole part is configured to receive an injected sole material for attaching the primary sole part to a ground facing surface of an upper of an article of footwear, such as a shoe.

The plurality of through-going holes of the primary sole part reduces the weight of the primary sole part by removing solid material from the primary sole part. Thereby the weight of the primary sole part may be reduced compared to a solid primary sole part typically used for cemented sole assemblies. The through going holes of the primary sole part further reduces rigidity of the primary sole part which provides a flexible primary sole which follows the shape of the foot of a user during use of the article of footwear. By making the primary sole part more flexible, the primary sole part follows the natural foot motion of the user which increase the comfort for a user wearing the article of footwear. Fitness walkers e.g. often desire a flexible, light-weight, and flat shoe as they strike with the heel and roll through each step. By increasing the flexibility, the primary sole part follows the natural foot motion and improves the comfort for the user of the shoe.

The plurality of through-going holes may be arranged in parallel rows extending in a longitudinal direction of the primary sole part. The parallel rows of through-going holes may be offset in relation to each other in a longitudinal direction of the primary sole part. Each through-going hole in a first row of the parallel rows may be offset by half a longitudinal length of the through-going hole in relation to a through-going hole in a neighbouring second row of the parallel rows. In some example embodiments, each through going hole may be offset by half the distance between respective centre points of two through-going holes arranged in the same row in relation to a through-going hole in a neighbouring second row of the parallel rows. By offsetting the rows of through-going holes from each other, the rows of through-going holes may be moved closer together while keeping a minimum of solid material between the holes to ensure structural rigidity of the primary sole part. Moving the rows of through-going holes closer to each other means that a higher number of through-going holes can be fitted onto a predetermined area, thereby further reducing the weight of the primary sole part. The solid sections of the primary sole part also provide the surface to which a second sole part, such as an injected material may bond to the primary sole part.

The plurality of through-going holes of the primary sole part may be tapered towards a foot facing surface of the primary sole part. The through-going holes being tapered towards the foot facing surface of the primary sole part facilitates a mounting and a releasing of the primary sole part to/from the primary mould part.

Depending on the desired characteristics of the primary sole part and/or an article of footwear comprising the primary sole part, the through-going holes may be distributed over different areas of the primary sole part. In one or more example embodiments, the plurality of through going holes may be distributed over a heel area of the primary sole part. Thereby, the flexibility of the primary sole part in the heel area may be increased. In one or more example embodiments, the plurality of through going holes may be distributed over a forefoot area of the primary sole part. Thereby, the flexibility of the primary sole part in the forefoot area may be increased. In one or more example embodiments, the plurality of through going holes may be distributed over a midfoot area of the primary sole part. Thereby, the flexibility of the primary sole part in the midfoot area may be increased.

The plurality of through-going holes may however also be distributed over one or more of the areas mentioned above. In one or more exemplary embodiments the plurality of through-going holes may be distributed over the heel area, the midfoot area and the forefoot area of the primary sole part. The plurality of through-going holes may thus be distributed, e.g. evenly distributed, from a heel end of the primary sole part to a toe end of the primary sole part.

The plurality of through-going holes may be arranged at a predetermined distance from each other. The plurality of through-going holes may be evenly distributed over the primary sole part, so as to create a grid of openings in the primary sole part. Evenly distributed herein means that the plurality of through-going holes may be separated by a first predetermined distance in a longitudinal direction of the primary sole part and/or separated by a second predetermined distance in a lateral direction of the primary sole part. The plurality of through going holes being separated by a first predetermined distance in the longitudinal direction means that the distance between any two adjacent through-going holes in the same row is the predetermined first distance. The plurality of through going holes being separated by a first predetermined distance in the lateral direction means that the distance between any two adjacent through-going holes in adjacent rows is the predetermined second distance. The distance may e.g. be determined from centre point of a first through-going hole to a centre point of a second through-going hole. The first and second predetermined distances may be equal for any adjacent holes. The first and second predetermined distances may be selected such that the through-going holes are separated by at least 1 mm of solid material in order to ensure structural rigidity of the primary sole part. The primary sole part may have a thickness in the range of 0.1 to 0.8 cm. Reducing the thickness of the primary sole part may reduce the weight of the primary sole part and may further increase the flexibility of the primary sole part. However, reducing the thickness of the primary sole part also reduces the structural integrity of the primary sole part. The thickness of the primary sole part may thus be selected within the range to satisfy different requirements on weight, flexibility and structural rigidity depending on type of article of footwear.

The plurality of through-going holes may be oblong and may be arranged on the primary sole part so that the longitudinal direction of the through-going holes extend in a longitudinal direction of the primary sole part.

In one or more example embodiments, the plurality of through-going holes may be oval. The through-going holes being oval herein means that the circumference of the through-going holes is oval, when seen in a direction perpendicular to the foot facing surface and/or the ground facing surface of the primary sole part. The holes having an oval shape means that the holes do not have any sharp edges which removes stress concentrations around the through-going holes, thereby reducing the risk of cracks occurring in the primary sole part around the through-going holes. Thereby, the risk of failure of the primary sole part can be reduced. The oval shape of the through-going holes also allows the rows of through-going holes to be positioned closer to each other when the rows are offset to each other. Due to the oval shape, the amount of solid material between two through-going holes of adjacent rows increases, in comparison to e.g. a rectangular shape of the through-going holes. The edges of the rectangular shape would cause the through-going holes in two adjacent rows to be closer to each other compared to the oval shape. In order to ensure that enough solid material of the primary sole part is available between the through-going holes, the rows would have to be positioned further way from each other if rectangular holes were uses instead of oval holes. Hence, the oval shape of the through-going holes allows the rows of through-going holes to be moved closer to each other which in turns allows a higher number of through-going holes to be fitted to the primary sole part in a predetermined area. Hence, the oval shape of the through-going holes allows the weight of the primary sole to be reduced further while maintaining a required structural stability of the primary sole part.

A radius of the through-going holes may be in the range of 0.2 to 1.2 cm. When the through-going holes are oval the through-holes may feature two diameters, a first diameter that runs through the shortest part of the oval, which may be referred to as the semi-minor axis, and a second diameter that runs through the longest part of the oval, which may be referred to as the semi-major axis. In this case, the first and the second radius are different, but may both be in the range of 0.2 to 1.2 cm.

The primary sole part may have an area of through-going holes versus an area of solids in the range of 30:70 to 60:40. Solids herein refers to a solid material of the primary sole part.

In one or more embodiments the primary sole part may be an outsole, such as an outsole for an article of footwear. When the primary sole part is an outsole, the ground facing surface of the primary sole part is the lowest part of the article of footwear and will thus be the ground contacting surface during use of the article of footwear.

When the primary sole part is an outsole the primary sole part may be provided in a material that is durable, and capable of withstanding contact with the ground. The primary sole part may comprise a thermoplastic polymer, such as thermoplastic rubber (TPR), Thermoplastic polyurethane (TPU), or polyurethane (PU), or a combination thereof.

In accordance with the present disclosure, there is further provided an article of footwear, the article of footwear comprising the primary sole part as disclosed herein.

The article of footwear may further comprise a secondary sole part having a second foot facing surface and a second ground facing surface, and an upper having a third ground facing surface. The secondary sole part may be arranged between the upper and the primary sole part. The secondary sole part may comprise an injected material. The sole assembly of the article of footwear may in some embodiments comprise one or more additional sole parts, such as e.g. a tertiary sole part.

The primary sole part may be any kind of sole part that may provide the article of footwear with an aesthetic look and/or a functional characteristic, where the secondary sole part may provide the article of footwear with a functional characteristic such as shock absorption between the ground facing surface of the upper and the primary sole part. The secondary sole part may provide a layer of material between the primary sole part and the upper, where the secondary sole part may improve a predefined characteristic of the article of footwear, such as a weight and/or a softness of the article of footwear, while the material of the primary sole part provide a stiffness to the article of footwear. Since the primary sole part may be the ground contacting sole part, the primary sole part may be provided in a material that is durable, and capable of withstanding contact with the ground, wherein the secondary sole part may be provided in a material that is lighter and/or provides a softer feel to the article of footwear. Thus, the primary sole part and the secondary sole part may be made of different materials, having different properties.

The secondary sole part may be seen as a part of an article of footwear where the secondary sole part bonds the primary sole part to the ground facing surface of the upper. The primary sole part may have a first hardness and the secondary sole part may have a second hardness, where the first hardness may be greater than the second hardness. The first hardness of the first sole material may be utilized to improve traction by providing traction elements on the ground facing surface of the primary sole part, to improve durability by providing the primary sole in a material that is capable of tolerating friction between the ground surface and the ground facing surface of the primary sole part. The secondary sole part may be provided in a material that has a second hardness that is lower than the first hardness, where the secondary sole part may be positioned between the foot of the wearer, when used, and the primary sole part and the ground. Thus, the softer material may improve the comfort of the article of footwear by providing a dampening layer that can absorb shocks that occur during gait.

In some exemplary embodiments, the secondary sole part extends from the first ground facing surface of the upper to the first foot facing surface of the primary sole part, and/or where the secondary sole part defines a second foot facing surface that is attached to the first ground facing surface of the upper and a third ground facing surface that is attached to the first foot facing surface of the primary sole part. The secondary sole part may be adapted to attach the primary sole part to the upper, where the secondary sole part extends in a vertical direction between the ground facing part of the upper towards the first foot facing surface of the primary sole part. Thus, the secondary sole part may bond to the first foot facing surface and the first ground facing surface. The secondary sole part may extend from a medial side primary sole part to a lateral side of the primary sole part, so that the primary sole part is attached to the upper from a medial side and continuously towards a lateral side.

The secondary sole part may be arranged to extend the entire length of a sole assembly and/or the article of footwear from the toe end to the heel end. The sole assembly may comprise the primary sole part and the secondary sole part. The secondary sole part may extend uninterrupted, so that the secondary sole part may provide dampening and/or shock absorption along the entire length of the sole assembly, from the heel end towards the toe end. Optionally, the secondary sole part may extend the entire width of the sole assembly, from the toe end towards the sole end creating a dampening element between the first sole part and the second sole part along the entire width and length of the sole assembly.

In some exemplary embodiments, the sole of the article of footwear may be a layered construction, where the primary sole part may be an outsole for an article of footwear, where the primary sole part may define the part of the footwear that comes into contact with the ground during normal use.

In some exemplary embodiments, the sole assembly of the article of footwear may be a layered construction where the secondary sole part may be a midsole for the article of footwear. The midsole may be primarily for shock absorption and/or to provide the article of footwear with a layer that may dampen the contact between the foot of the wearer and the ground.

By making the primary sole part out of a durable and sturdy material, a structural stiffness of a sole assembly comprising the primary sole part and the secondary sole part can be ensured, while the injected material may be softer than the material of the primary sole part, thus the comfort of the article of footwear may be improved by providing a dampening layer that can absorb shocks that occur during gait.

The article of footwear may be manufactured using direct injection moulding equipment, where the upper and the primary sole part may be positioned in a moulding assembly. The moulding assembly may comprise a side part, wherein the side part may form a peripheral part of the moulding assembly. The upper and the primary sole part may be positioned at a distance from each other in the moulding assembly, such that a main volume is created between the upper, the primary sole part and the side part of the moulding assembly. Thus, the injected material may expand and cure inside the moulding assembly, so that the upper and/or the primary sole part are maintained in their position during the expansion of the injected material, so that when the injected material cures, the injected material bonds the primary sole part to the upper. When the injected material has expanded and cured the injected material may form the secondary sole part.

The use of direct injection moulding for forming the secondary sole part means that the secondary sole part will adapt to the form of the primary sole part and the ground facing surface of the upper. This means that the injected material will fill out all open volumes. In other words, the injected material will penetrate and expand into all parts of each of the open volumes. In order to ensure that the injected material does not penetrate and expand into the plurality of through-going holes in the primary sole part, the present disclosure further discloses a footwear sole moulding assembly for moulding a footwear comprising the primary sole part as disclosed herein.

The footwear sole moulding assembly comprises a primary mould part being configured to receive the primary sole part as disclosed herein. The primary mould part comprises a plurality of protrusions configured to mate with the plurality of through-going holes of the primary sole part. The primary mould part may correspond in size and shape to the outer shape of the ground facing surface of the primary sole part.

The plurality of protrusions may correspond, such as in shape and position, to the plurality of through-going holes of the primary sole part. An outer circumference of each of the plurality of protrusions of the primary mould part may be equal to or larger than an inner circumference of a corresponding through-going hole in the primary sole part, so that injected material is prevented from entering into or pass through the through-going holes during injection moulding. The plurality of protrusion having an outer circumference equal to or larger to the inner circumference of a corresponding through-going hole in the primary sole part, means that the plurality of protrusion will fit tightly or snugly into the plurality of through-going holes, thereby closing off the through-going holes during the moulding process so that the injected material cannot enter the through-going holes. The moulding process may e.g. be an injection moulding process.

The plurality of protrusions may have an oblong shape having a length, such as a longest extension, in a longitudinal direction of the primary sole part.

Each of the plurality of protrusions of the primary mould part have a height equal to or higher than a height of the primary sole part at a corresponding through-going hole of the primary sole part. When the protrusions have the height equal to the height of the primary sole part at the corresponding through-hole, an even surface is created for receiving injected material when the primary sole part is arranged on the primary mould part. The even surface may improve a flow of the injected material within the moulding assembly which reduces the likelihood of air pockets forming in the injected material, which may cause stress concentration in the injected material. Thereby the risk of damages to the secondary sole part during use of the article of footwear may be reduced. Furthermore, by providing an even surface for receiving the injected material, seams along the foot facing surface of the primary sole part and the injected material, which may e.g. be a midsole may be reduced or completely eliminated. Thereby a seamless construction of the sole assembly may be provided, which eliminates uneven points on the sole, which may cause rubbing that may be uncomfortable for the user or may even lead to blisters on the foot of the user. Thereby, the comfort of the user of the article of footwear may be further increased.

In one or more exemplary footwear sole moulding assemblies, the plurality of protrusions may have a first height higher than the height of the primary sole part, such that the protrusions protrude above the foot facing surface of the primary sole part. Thereby, an indentation may be provided in the injected material, such as in the secondary sole part, which increases the distance from the injected material to the ground when the article of footwear is being used. This may reduce the risk of the injected material being penetrated by external objects, such as sticks or stones, laying on the ground. Objects penetrating the injected material may lead to moisture entering the secondary sole part which may lead to premature failure of the secondary sole part and thereby to a potential failure of the article of footwear.

In one or more exemplary footwear sole moulding assemblies, the plurality of protrusions may extend in a vertical direction perpendicular to a main surface of the primary mould part, such that, when the primary sole part is arranged on the primary mould part, the plurality of protrusion extend from the ground facing surface of the primary sole part to the foot facing surface of the primary sole part. In one or more exemplary footwear sole moulding assemblies, the plurality of protrusions of the primary mould part may be tapered, so that the plurality of protrusions are wider towards the main surface of the primary mould part and become thinner towards the top of the protrusions towards a foot facing surface of the primary sole part. The tapered shape of the plurality of protrusions may correspond to the tapered shape of the plurality of through-going holes of the primary sole part. By making the through-going holes and the protrusions tapered, a release of the primary sole part from the primary mould part after moulding is facilitated. In other words, the tapered shape of the through-going holes and the protrusions enables easy release of the primary sole part from the primary mould part after moulding.

The footwear sole moulding assembly may be configured to receive an injected material, wherein the injected material defining a secondary sole part of the footwear. The footwear moulding assembly may be configured to receive the injected material by means of a direct injection process. In order to be able to receive and contain the injected material, the footwear sole moulding assembly may comprise a first and/or a second side frame defining at least a part of a side of the moulding assembly.

Further, a method for moulding a footwear is disclosed. The method comprises mounting the primary sole part as disclosed herein to a footwear sole moulding assembly as disclosed herein, so that the plurality of protrusions of the primary mould part mate with the plurality of through-going holes of the primary sole part and protrude through the plurality of through-going holes The method further comprises injecting a material into the footwear moulding assembly, such that the injected material adheres to the foot facing surface of the primary sole part and defines a secondary sole part of the footwear.

In one or more exemplary methods, the method comprises injecting a material onto the footwear sole moulding assembly, the injected material defining a secondary sole part of the footwear, the secondary sole part being configured to be positioned between the primary sole part and an upper of the footwear.

The article of footwear may e.g. be manufactured by premanufacturing the upper and the primary sole part. The upper may be positioned in the footwear sole moulding assembly relative to the primary sole part, so that a volume, which may also be referred to as a mould cavity, is created between the foot facing surface of the primary sole part and the upper. The volume may further be enclosed by one or more side parts of the mould assembly, wherein the side part may form a peripheral part of the mould. The construction of the article of footwear may be finalized by injecting the injected material into the volume created between the upper and the primary sole part, and fills up the volume, thereby creating the secondary sole part. The secondary sole part may comprise a thermoplastic polymer, such as thermoplastic rubber (TPR), Thermoplastic polyurethane (TPU), or polyurethane (PU), or a combination thereof. In some example embodiments, the secondary sole material may be a polyurethane foam, which expands into the mould cavity.

In some example embodiments, the primary sole part and a top surface of the plurality of protrusions of the primary mould part may define a first mould surface, such as a bottom mould surface of the mould cavity for the secondary sole part. Thus, the injected material and/or the secondary sole part may adhere to the foot facing surface of the primary sole part.

The method for moulding a footwear may further comprise, after the injected material has cured, removing the article of footwear from the footwear sole moulding assembly such that the primary sole part is released from the primary mould part. Thereby, the plurality of through-going holes are released from the plurality of protrusions of the primary mould part.

Exemplary embodiments of the primary sole part, the footwear moulding assembly and the article of footwear will be described in further detail with reference to the figures. The figures are schematic and simplified for clarity, and they merely show details which aid understanding the disclosure, while other details have been left out. Throughout, the same reference numerals are used for identical or corresponding parts.

FIG. 1 shows a top down view of the primary sole part 10, seen in a direction of the foot facing surface 11, according to one or more example embodiments herein. The primary sole part 10 comprises a toe end 2 and a heel end 3, which is adapted to surround the periphery of the primary sole part 10. The foot facing surface 11 is configured to face an upper (not shown in FIG. 1). The primary sole part 10 comprises a plurality of through-going holes 14. The plurality of open through-going holes 14 extend in a vertical direction from the foot facing surface 11 to the ground facing surface (not shown in FIG. 1) of the primary sole part 10. The foot facing surface of the primary sole part is configured to receive an injected sole material for attaching the primary sole part to a ground facing surface of an upper of an article of footwear.

The plurality of through-going holes 14 may be arranged in parallel rows extending in a longitudinal direction of the primary sole part 10 (as indicated by the dotted lines in FIG. 1 extending from the heel end to the toe end). The parallel rows of through-going holes 14 may be offset in relation to each other in a longitudinal direction of the primary sole part. The parallel rows of through-going holes 14 may e.g. be offset in relation to each other by a distance $L_1$ in a longitudinal direction of the primary sole part. The longitudinal direction extends along the axis Z. The distance of $L_1$ may depend on implementation. In some example embodiments, the distance $L_1$ may be half the distance $L_2$ between the centre points of two through-going holes 14 arranged in the same row. In some example embodiments the distance $L_1$ may be half a longitudinal length of the through-going hole 14, such as e.g. the radius along the semi-major axis of an oval through-going hole, in relation to a through-going hole in a neighbouring second row of the parallel rows. By offsetting the rows of through-going holes 14 from each other, the rows of through-going holes 14 may be moved closer together while keeping a minimum of solid material between the holes to ensure structural rigidity of the primary sole part. Moving the rows of through-going holes closer to each other means that a higher number of through-going holes can be fitted onto a predetermined area, thereby further reducing the weight of the primary sole part.

The foot facing surface 11 of the primary sole part is configured to be joined to the upper by receiving an injected material, such that the injected material extends between the upper, such as between a ground facing surface of the upper, and the foot facing surface 11 of the primary sole part 10. The primary sole part 10 may further comprise a solid section 10A surrounding the plurality of through-going holes 14 and/or the area in which the plurality of through-going holes 14 is arranged. The solid section 10A provides rigidity to the primary sole part 10 and also provides a contacting and bonding surface for the injected material of the secondary sole part.

In the example embodiment shown in FIG. 1 the plurality of through-going holes 14 are oval. The through-going holes 14 being oval herein means that the circumference of the through-going holes 14 is oval, when seen in a direction perpendicular to the foot facing surface 11 and/or the ground facing surface of the primary sole part. The oval shape of the through-going holes 14 allows the rows of through-going holes 14 to be positioned closer to each other when the rows are offset to each other. Due to the oval shape, the amount of solid material between two through-going holes 14 of adjacent rows increases, in comparison to e.g. a rectangular shape of the through-going holes 14. Hence, the oval shape of the through-going holes 14 allows the rows of through-going holes 14 to be moved closer to each other which in turns allows a higher number of through-going holes to be fitted to the primary sole part 11 in a predetermined area. The oval shape of the through-going holes 14 allows the weight of the primary sole 11 to be reduced further while maintaining a required structural stability of the primary sole part. Furthermore, the oval shape of the through-going holes reduces the risk of cracks forming around the circumference of the through-going holes 14 since the circumference does not comprise any sharp edges or corners, which otherwise may lead to premature failure of the article of footwear.

Depending on the desired characteristics of the primary sole part 10 and/or an article of footwear comprising the primary sole part 10, the through-going holes 14 may be arranged in different areas of the primary sole part. FIG. 2A-2C shows different arrangements of through-going holes on the primary sole part. FIG. 2A shows an example embodiment of the primary sole part 10, wherein the plurality of through going holes 14 are distributed over a forefoot area 4 of the foot facing surface 11 in a plurality of parallel rows extending in a lateral direction of the primary sole part 1. Thereby, the flexibility of the primary sole part 10 in the forefoot area 4 may be increased. FIG. 2B shows an example embodiment of the primary sole part 10, wherein the plurality of through going holes 14 are distributed over a midfoot area 6 of the primary sole part 1. Thereby, the flexibility of the primary sole part 10 in the midfoot area 6 may be increased. FIG. 2C shows an example embodiment of the primary sole part 10, wherein the plurality of through going holes 14 are distributed over a heel area 5 of the primary sole part 10. Thereby, the flexibility of the primary sole 10 part in the heel area 5 may be increased.

Figure 3:
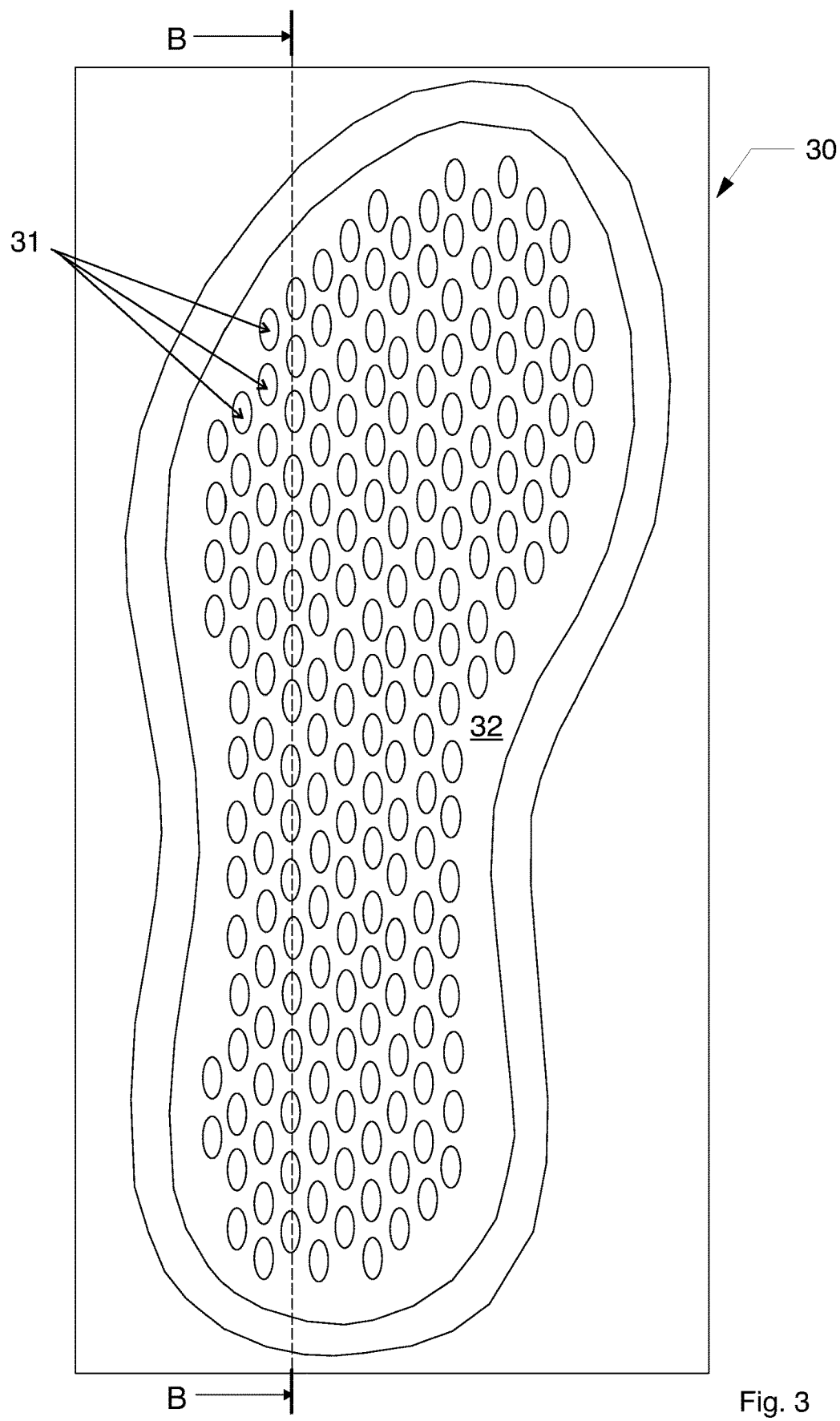
FIG. 3 shows a top down view of a foot facing surface of a primary mould part.

FIG. 3 shows the primary mould part 30. The primary mould part 30 is configured to receive the primary sole part 10. The primary mould part 30 comprises a plurality of protrusions 31 being configured to mate with the plurality of through-going holes 14 of the primary sole part 11. In order to receive the primary sole part 10, the primary mould part 30 is shaped as the ground facing surface of the primary sole part and thus mirrors the shape of the ground facing surface of the primary sole part 10. The plurality of protrusions 31 may correspond, such as in shape and position, to the plurality of through-going holes 14 of the primary sole part 10. The plurality of protrusions may thus also have an oblong shape, such as an oval shape as show in FIG. 3. The plurality of protrusions 31 may thus also be arranged in parallel rows extending in a longitudinal direction of the primary mould part, in correspondence with the arrangement of the through-going holes 14 of the primary sole part. The parallel rows of protrusions 31 may be offset in relation to each other in a longitudinal direction of the primary mould part in a similar way as the rows of through-going holes 14 of the primary sole part. FIG. 3 shows the primary mould part in an embodiment where the through-going holes 14 of the primary mould part 10 are distributed from a toe end to a heel end of the primary sole part 10. In case the plurality of through-going holes 14 are only distributed over certain areas of the primary sole part 10, such as over the heel area, the forefoot area and/or the midfoot area, the plurality of protrusions of the primary mould part 30 may be arranged accordingly.

An outer circumference of each of the plurality of protrusions 31 of the primary mould part 30 may be equal to or larger than an inner circumference of a corresponding through-going hole 14 in the primary sole part 10, so that the plurality of protrusions 31 fit tightly or snugly into the plurality of through-going holes 14 when the primary sole part 10 is mounted on the primary mould part 30. Thereby closing off the through-going holes 14 during the moulding process so that the injected material cannot enter the through-going holes 14.

FIGS. 4A and 4B show a cross sectional view of the primary sole part 10 and the primary mould part 31 according to one or more of the embodiments herein. FIG. 4A shows the cross-sectional view of the primary sole part 10 along the cut-line A-A of FIG. 1. The primary sole part 10 has a first foot facing surface 11 and a first ground facing surface 9. The plurality of through-going holes 14 extend in a vertical direction from the foot facing surface 11 to the ground facing surface 9 of the primary sole part and are open towards both the foot facing surface 11 to the ground facing surface 9. The foot facing surface 11 of the primary sole part 10 is configured to receive an injected sole material for attaching the primary sole part 10 to a ground facing surface of an upper of an article of footwear. The primary sole part 10 has a height $h_1$, which may also be referred to as a thickness in the area of the through-going holes 14 of the primary sole 10 part at a corresponding through-going hole 14 of the primary sole part 10. The plurality of through-going holes 14 are configured to mate with the plurality of protrusions 31 of the primary mould part 30 when the primary sole part 10 is arranged on the primary mould part 30, such that the plurality of protrusions 31 protrude through the plurality of through-going holes 14.

Figure 2:
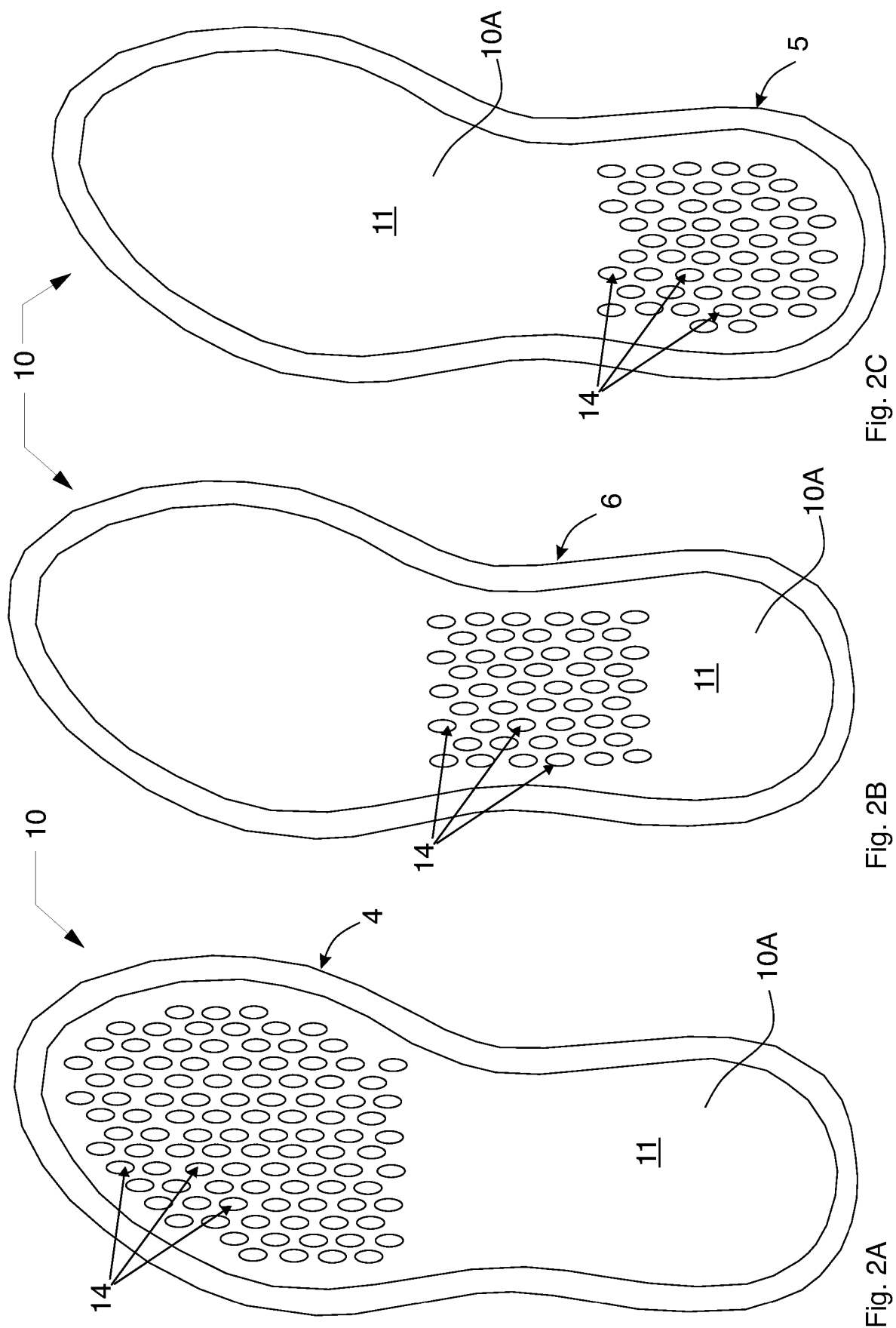
FIG. 2A-2C show a top down view of a foot facing surface of the primary sole part having various arrangements of the through-going holes.

FIG. 4B shows the cross-sectional view of the primary mould part 30 along the cut-line B-B of FIG. 2. The plurality of protrusions 31 extend in a vertical direction perpendicular to a main surface 32 of the primary mould part 30, such that, when the primary sole part 10 is arranged on the primary mould part 30, the plurality of protrusions 31 extend from the ground facing surface 9 of the primary sole part to the foot facing surface 11 of the primary sole part 10. Each of the plurality of protrusions 31 of the primary mould part 30 may have a height $h_2$ equal to or higher than a height $h_1$ of the primary sole 10 part at a corresponding through-going hole 14 of the primary sole part 10. The height $h_2$ may be the distance from the main surface 32 of the primary mould part to a top surface 31A of the plurality of protrusions 31. When the protrusions 31 have the height $h_2$ equal to the height $h_1$ of the primary sole part at the corresponding through-hole 14, an even surface is created for receiving injected material when the primary sole part 10 is arranged on the primary mould part 30. The even surface may improve a flow of the injected material within the moulding assembly.

Figure 5:
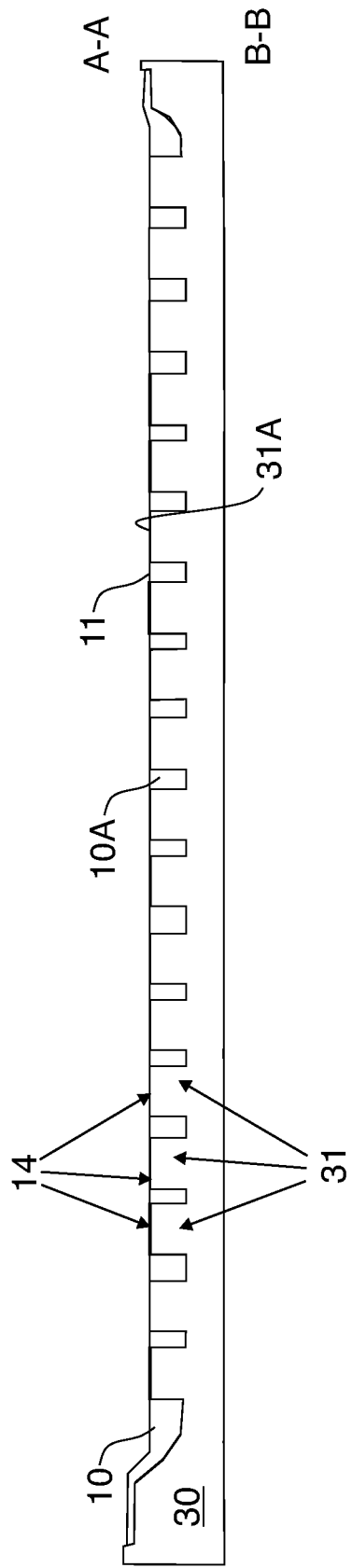
FIG. 5 shows a longitudinal cross-sectional view of the primary sole part arranged on the primary mould part.

FIG. 5 shows a cross-sectional view along the cut axes A-A and B-B of the primary sole part 10 mounted to the primary mould part 30. As can be seen in FIG. 5, the plurality of protrusions 31 of the primary mould part 30 mate with the plurality of through-going holes 14 of the primary sole part 10, such that the plurality of protrusions 31 close the plurality of through-going holes 14. The plurality of protrusions 31 mating with the plurality of through-going holes 14 means that the plurality of protrusions 31 protrude into the plurality of through-going holes 14, such that the plurality of through-going holes 14 receive the plurality of protrusions 31. The plurality of protrusions 31 are configured such that they fit tightly or snugly in the plurality of through-going holes 14, thereby sealing of the plurality of through-going holes 14. The combination of the primary sole part 10 and the primary mould part 30 may define part of a mould cavity of the secondary sole part. By closing and/or sealing off the plurality of through-going holes 14 in the primary sole part 10 with the protrusions 31 of the primary mould part 30, the injected material of the secondary sole part is prevented from entering into the plurality of through-going holes 14 during the injection moulding process. When the primary sole part 10 is mounted to the primary mould part 30 such that the plurality of protrusions 31 have mated with the plurality of through-going holes 14 and when the height $h_2$ is equal to the height $h_1$, the foot facing surface 11 of the primary sole part 10 may align with the top surface 31A of the plurality of protrusions. Thereby, a flat surface may be provided, which flat surface defines a lower boundary of the mould cavity for receiving the injected material. After the injected material has cured in the mould cavity and the primary mould part has been removed, the secondary sole part 20 formed by the injected material bonds to the foot facing surface 11 of the primary sole part 10 and may span the entire foot facing surface 11. The secondary sole part 20 may thus also span the plurality of through-going holes 14 without protruding into the through-going holes 14.

Figure 6:
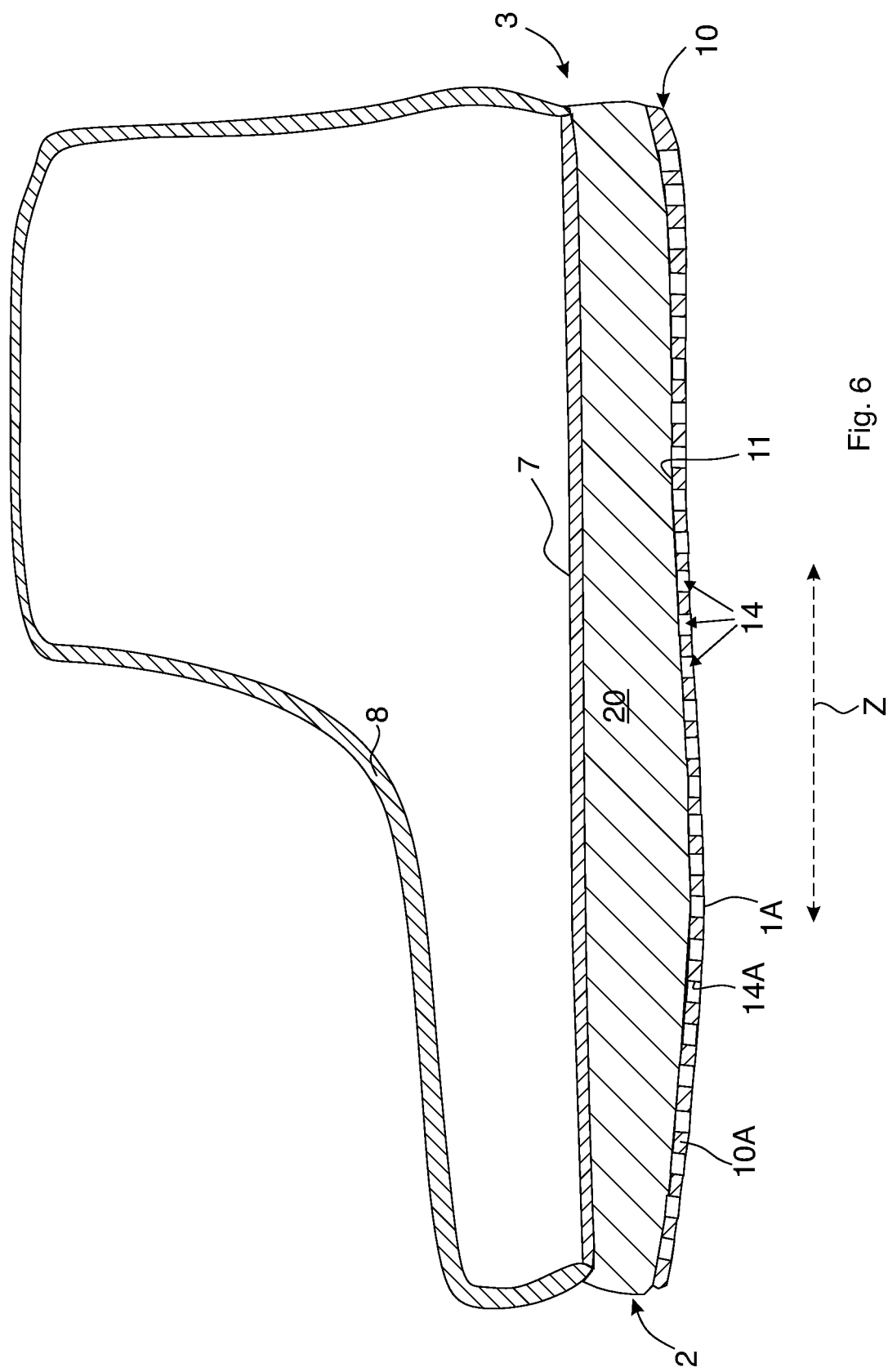
FIG. 6 shows a longitudinal cross-sectional view of the article of footwear.

FIG. 6 shows a cross sectional view of an example article of footwear 1, taken along the longitudinal axis Z, where the article of footwear comprises a sole assembly, the sole assembly comprising the primary sole part 10, the secondary sole part 20 and the upper 8 as shown in FIG. 5. The sole assembly may comprise one or more additional sole parts, such as e.g. a tertiary sole part. The primary sole part 10 extends from a toe end 2 of the article of footwear 1 towards a heel end 3 of the article of footwear 1, where the upper 8 and an insole 7 are attached to the primary sole part 10 via the secondary sole part 20. The secondary sole part 20 may extend uninterrupted from the toe end 2 to the heel end 3, creating a dampening layer that is arranged between the primary sole part 10 and the upper 8 along the entire longitudinal length along the axis Z of the article of footwear. The plurality of through-going holes 14 are arranged from the heel end 3 of the primary sole part 10 to the toe end 2 of the primary sole part 10 in a plurality of parallel rows extending in a longitudinal direction of the primary sole part 10. Thereby, the flexibility of the primary sole part 10 and the article of footwear 1 may be increased. The weight of the primary sole part 10 and the article of footwear 1 may also be reduced. The reduced weight of the primary sole part 10 and the article of footwear 1 improves the comfort of the article of footwear during use. The secondary sole part 20 may spans the plurality of through-going holes 14 without protruding into the through-going holes 14. The plurality of through-going holes 14 in the primary sole part 10 may also improve the grip of the primary sole part 10 and the article of footwear 1 in the longitudinal direction during use. The inside 14A, such as an inner side wall, of the plurality of through-going holes 14 form one or more surfaces being perpendicularly arranged in relation to the ground facing surface 9 of the primary sole part 10. These perpendicularly arranged surfaces may configured to take up forces in the longitudinal and in the lateral direction of the article of footwear 1 and may thus improve the grip of primary sole part 10 during use of the article of footwear 1.

The primary sole part 10 may have a first hardness and the secondary sole part 20 may have a second hardness, where the first hardness may be greater than the second hardness. The first hardness of the first sole material may be utilized to provide and/or improve durability by providing the primary sole 10 in a material that is capable of tolerating friction between the ground surface and the ground facing surface 9 of the primary sole part 10. The secondary sole 20 part may be provided in a material that has a second hardness that is lower than the first hardness, where the secondary sole part 20 may be positioned between the foot of the wearer, when used, and the primary sole part 10 and the ground. Thus, the softer material may improve the comfort of the article of footwear 1 by providing a dampening layer that can absorb shocks that occur during gait. The secondary sole part may be arranged between the upper and the primary sole part. The secondary sole part may further comprise an injected material. The injected material may have been injected onto the primary sole part 10 arranged on the primary mould part 30 of a footwear moulding assembly as shown in FIG. 3 during an injection moulding procedure. Since the plurality of protrusions 31 of the primary mould part 30 mate with the through-going holes during the injection procedure, the injected material has not been able to enter the through-going holes 14 of the primary sole part 10. Hence, the secondary sole part 20 is arranged flush with the foot facing surface 11 of the primary sole part 10 also in the regions of the through-going holes 14.

As can be seen in FIG. 5 the ground facing surface 9 may comprise or may be a ground contacting surface. The ground contacting surface may be located in a heel area 5 and in a forefoot area 4 or may, as shown in FIG. 5, be located over the entire ground facing surface 9 of the primary sole part 10.

The use of the terms "first", "second", "third" and "fourth", "primary", "secondary", "tertiary" etc. does not imply any particular order but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Furthermore, the labelling of a first element does not imply the presence of a second element and vice versa.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims.

It should be noted that features relating to the a primary sole part may be combined with the features of a mould assembly or a method of moulding a sole assembly.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly, to be regarded in an illustrative rather than restrictive sense. The claimed invention is intended to cover all alternatives, modifications, and equivalents.

LIST OF REFERENCES

1 Article of footwear
2 Toe end
3 Heel end
4 Forefoot area
5 Heel area
6 Midfoot area
7 Insole
8 Upper
9 First ground facing surface
10 Primary sole part
10A Solid section of primary sole part
11 First foot facing surface
12 Second ground facing surface
14 Through-going hole
20 Secondary sole part
21 Secondary foot facing surface
22 Third ground facing surface
30 Primary mould part
31 Protrusion
31A Top surface of protrusion
32 Main surface of primary mould part
$h_1$ Thickness of primary sole part
$h_2$ Height of protrusions

The invention claimed is:

1. A footwear sole moulding assembly comprising:
a prefabricated primary sole part configured for forming part of an article of footwear, the prefabricated primary sole part being an outsole and having a foot facing surface, and a ground facing surface, wherein the prefabricated primary sole part comprises a plurality of through-going holes, wherein the plurality of through-going holes extends in a vertical direction from the foot facing surface to the ground facing surface; wherein the foot facing surface is configured to receive an injected sole material for attaching the prefabricated primary sole part to a ground facing surface of an upper; and
a primary mould part comprising a plurality of protrusions configured to mate with the plurality of through-going holes of the prefabricated primary sole part, the primary mould part configured to be arranged at the ground facing surface of the prefabricated primary sole part during a moulding process,
wherein the plurality of protrusions of the primary mould part are configured to protrude through at least one through-going hole of the plurality of through-going holes of the prefabricated primary sole part, so as to close the at least one through-going hole at the foot facing surface of the prefabricated primary sole part during the moulding process.

2. The footwear sole moulding assembly in accordance with claim 1, wherein the plurality of through-going holes are arranged in parallel rows extending in a longitudinal direction of the prefabricated primary sole part.

3. The footwear sole moulding assembly according to claim 2, wherein the through-going holes in neighbouring parallel rows are offset in relation to each other in a longitudinal direction of the prefabricated primary sole part.

4. The footwear sole moulding assembly according to claim 3, wherein each through-going hole of the plurality of through-going holes in a first row of the parallel rows is offset by half a longitudinal length of the respective through-going hole in relation to a through-going hole of the plurality of through-going holes in a neighbouring second row of the parallel rows.

5. The footwear sole moulding assembly according to claim 1, wherein the plurality of through-going holes are oblong and are arranged on the prefabricated primary sole part so that a longitudinal direction of the plurality of through-going holes extend in a longitudinal direction of the prefabricated primary sole part.

6. The footwear sole moulding assembly according to claim 1, wherein the plurality of through-going holes have an oval shape.

7. The footwear sole moulding assembly according to claim 1, wherein a radius of the plurality of through-going holes is in a range of 0.2 to 1.2 cm.

8. The footwear sole moulding assembly according to claim 1, wherein the plurality of through-going holes are evenly distributed over the prefabricated primary sole part, so as to create a grid of openings in the prefabricated primary sole part.

9. The footwear sole moulding assembly according to claim 1, wherein an outer circumference of each of the plurality of protrusions of the primary mould part is equal to or larger than an inner circumference of a corresponding through-going hole in the prefabricated primary sole part, so that injected material is prevented from entering into the respective through-going holes during injection moulding.

10. The footwear sole moulding assembly according to claim 1, wherein each of the plurality of protrusions of the primary mould part have a first height equal to or higher than a height of the prefabricated primary sole part at a corresponding through-going hole of the prefabricated primary sole part.

11. The footwear sole moulding assembly according to claim 1, wherein the footwear sole moulding assembly is configured to receive an injected material, the injected material defining a secondary sole part of the footwear.

* * * * *